(12) United States Patent
Waxman (10) Patent No.: US 7,965,979 B2
(45) Date of Patent: Jun. 21, 2011

(54) METHODS AND APPARATUS FOR PROVIDING AN EXTENDED-LOCAL AREA SYSTEM BASED ON SHORT MESSAGING SERVICE

(75) Inventor: Shay Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1305 days.

(21) Appl. No.: 11/416,957

(22) Filed: May 2, 2006

(65) Prior Publication Data

US 2007/0259677 A1    Nov. 8, 2007

(51) Int. Cl.
    *H04B 7/15* (2006.01)
(52) U.S. Cl. ..... 455/11.1; 455/466; 455/465; 455/552.1; 455/7; 455/502; 455/422.1; 370/350; 370/492
(58) Field of Classification Search ........... 455/466, 455/465, 552.1, 11.1, 7, 502, 422.1; 370/350, 370/492
    See application file for complete search history.

(56) References Cited

U.S. PATENT DOCUMENTS

| | | | | |
|---|---|---|---|---|
| 6,606,502 | B1 * | 8/2003 | Chung Kam Chung et al. | 455/466 |
| 7,142,876 | B2 * | 11/2006 | Trossen et al. | 455/456.3 |
| 7,310,688 | B1 * | 12/2007 | Chin | 709/252 |
| 7,412,240 | B2 * | 8/2008 | Hunkeler | 455/436 |
| 7,471,655 | B2 * | 12/2008 | Gallagher et al. | 370/329 |
| 2003/0118015 | A1 * | 6/2003 | Gunnarsson et al. | 370/389 |
| 2005/0002407 | A1 * | 1/2005 | Shaheen et al. | 370/401 |
| 2005/0020299 | A1 * | 1/2005 | Malone et al. | 455/552.1 |
| 2005/0124329 | A1 | 6/2005 | Yadav | |
| 2006/0040656 | A1 * | 2/2006 | Kotzin | 455/426.2 |
| 2007/0110011 | A1 * | 5/2007 | Nelson | 370/338 |

OTHER PUBLICATIONS

International Search Report mailed on Oct. 5, 2007 for International Application No. PCT/US2007/067995, 6 pgs.
Jinyang Li, "A Scalable Location Service for Geographic Ad Hoc Routing," MIT Master Thesis, Jan. 2001, 57 pgs.
Jinyang Li et al., "A Scalable Location Service for Geographic Ad Hoc Routing," ACM Mobicom 2000, Boston, MA, pp. 120-130.
Maximilian Riegel, "Wireless LAN IEEE802.11 Tutorial," ICM networks Advanced Standardization, http://www.max.franken.de, Munich, Oct. 18, 2002, 84 pgs.
Shay Waxman, "Wireless Communication Device and Method for Coordinating Communications Among . . . ", U.S. Appl. No. 11/322,465, filed Dec. 30, 2005.
Shay Waxman, "Apparatus, System and Method With Improved Coexistence Between Multiple Wireless . . . ", U.S. Appl. No. 11/340,327, filed Jan. 25, 2006.
Shay Waxman, "Techniques to Collaborate Wireless Terminal Position Location Information From Multiple Wireless Networks", U.S. Appl. No. 11/377,707, filed Mar. 15, 2006.

* cited by examiner

*Primary Examiner* — Patrick N Edouard
*Assistant Examiner* — Aung Win
(74) *Attorney, Agent, or Firm* — Schwabe, Williamson & Wyatt, P.C.

(57) ABSTRACT

Embodiments of methods and apparatus for providing an extended-local area system based on short messaging service are generally described herein. Other embodiments may be described and claimed.

24 Claims, 5 Drawing Sheets

METHODS AND APPARATUS FOR PROVIDING AN EXTENDED-LOCAL AREA SYSTEM BASED ON SHORT MESSAGING SERVICE

TECHNICAL FIELD

The present disclosure relates generally to wireless communication systems, and more particularly, to methods and apparatus for providing an extended-local area system based on short messaging service.

BACKGROUND

As wireless communication becomes more and more popular at offices, homes, schools, etc., different wireless technologies and applications may work in tandem to meet the demand for computing and communications at anytime and/or anywhere. For example, a variety of wireless communication networks may co-exist to provide a wireless environment with more computing and/or communication capability, greater mobility, and/or eventually seamless roaming.

In particular, wireless personal area networks (WPANs) may offer fast, short-distance connectivity within a relatively small space such as an office workspace or a room within a home. Wireless local area networks (WLANs) may provide broader range than WPANs within office buildings, homes, schools, etc. Wireless metropolitan area networks (WMANs) may cover a greater distance than WLANs by connecting, for example, buildings to one another over a broader geographic area. Wireless wide area networks (WWANs) may provide the broadest range as such networks are widely deployed in cellular infrastructure. Although each of the above-mentioned wireless communication networks may support different usages, co-existence among these networks may provide a more robust environment with anytime and anywhere connectivity.

DETAILED DESCRIPTION

In general, methods and apparatus for providing an extended-local area system based on short messaging service are described herein. The methods and apparatus described herein are not limited in this regard.

Figure 1:
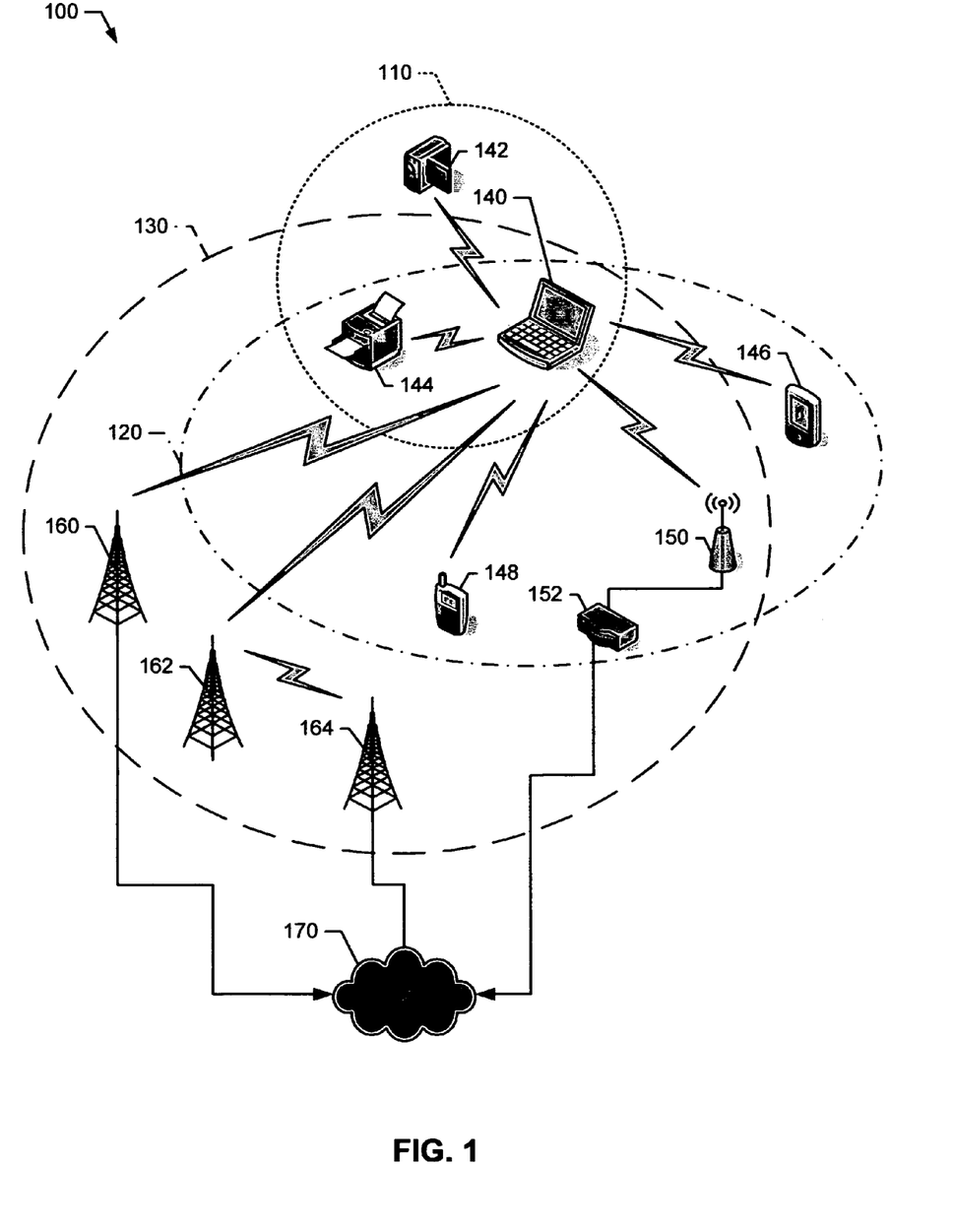
FIG. 1 is a schematic diagram representation of an example wireless communication system according to an embodiment of the methods and apparatus disclosed herein.

Referring to FIG. 1, an example wireless communication system 100 may include one or more wireless communication networks, generally shown as 110, 120, and 130. In particular, the wireless communication system 100 may include a wireless personal area network (WPAN) 110, a wireless local area network (WLAN) 120, and a wireless metropolitan area network (WMAN) 130. Although FIG. 1 depicts three wireless communication networks, the wireless communication system 100 may include additional or fewer wireless communication networks. For example, the wireless communication networks 100 may include additional WPANs, WLANs, and/or WMANs. The methods and apparatus described herein are not limited in this regard.

The wireless communication system 100 may also include one or more subscriber stations, generally shown as 140, 142, 144, 146, and 148. For example, the subscriber stations 140, 142, 144, 146, and 148 may include wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts five subscriber stations, the wireless communication system 100 may include more or less subscriber stations.

The subscriber stations 140, 142, 144, 146, and 148 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, the laptop computer 140 may operate in accordance with suitable wireless communication protocols that require very low power such as Bluetooth®, ultra-wide band (UWB), and/or radio frequency identification (RFID) to implement the WPAN 110. In particular, the laptop computer 140 may communicate with devices associated with the WPAN 110 such as the video camera 142 and/or the printer 144 via wireless links.

In another example, the laptop computer 140 may use direct sequence spread spectrum (DSSS) modulation and/or frequency hopping spread spectrum (FHSS) modulation to implement the WLAN 120 (e.g., the 802.11 family of standards developed by the Institute of Electrical and Electronic Engineers (IEEE) and/or variations and evolutions of these standards). For example, the laptop computer 140 may communicate with devices associated with the WLAN 120 such as the printer 144, the handheld computer 146 and/or the smart phone 148 via wireless links. The laptop computer 140 may also communicate with an access point (AP) 150 via a wireless link. The AP 150 may be operatively coupled to a router 152 as described in further detail below. Alternatively, the AP 150 and the router 152 may be integrated into a single device (e.g., a wireless router).

The laptop computer 140 may use OFDM modulation to transmit large amounts of digital data by splitting a radio frequency signal into multiple small sub-signals, which in turn, are transmitted simultaneously at different frequencies. In particular, the laptop computer 140 may use OFDM modulation to implement the WMAN 130. For example, the laptop computer 140 may operate in accordance with the 802.16 family of standards developed by IEEE to provide for fixed, portable, and/or mobile broadband wireless access (BWA) networks (e.g., the IEEE std. 802.16-2004 (published Sep. 18, 2004), the IEEE std. 802.16e (published Feb. 28, 2006), the IEEE std. 802.16f (published Dec. 1, 2005), etc.) to communicate with base stations, generally shown as 160, 162, and 164, via wireless link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). The methods and apparatus described herein are not limited in this regard.

The WLAN 120 and WMAN 130 may be operatively coupled to a common public or private network 170 such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. In one example, the WLAN 120 may be operatively coupled to the common public or private network 170 via the AP 150 and/or the router 152. In another example, the WMAN 130 may be operatively coupled to the common public or private network 170 via the base station(s) 160, 162, and/or 164.

The wireless communication system 100 may include other suitable wireless communication networks. For example, the wireless communication system 100 may include a wireless wide area network (WWAN) (not shown). The laptop computer 140 may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, Third Generation Partnership Project (3GPP) technology, standards based on these technologies, variations and evolutions of these standards, and/or other suitable wireless communication standards. Although FIG. 1 depicts a WPAN, a WLAN, and a WMAN, the wireless communication system 100 may include other combinations of WPANs, WLANs, WMANs, and/or WWANs. The methods and apparatus described herein are not limited in this regard.

The wireless communication system 100 may include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

Figure 2:
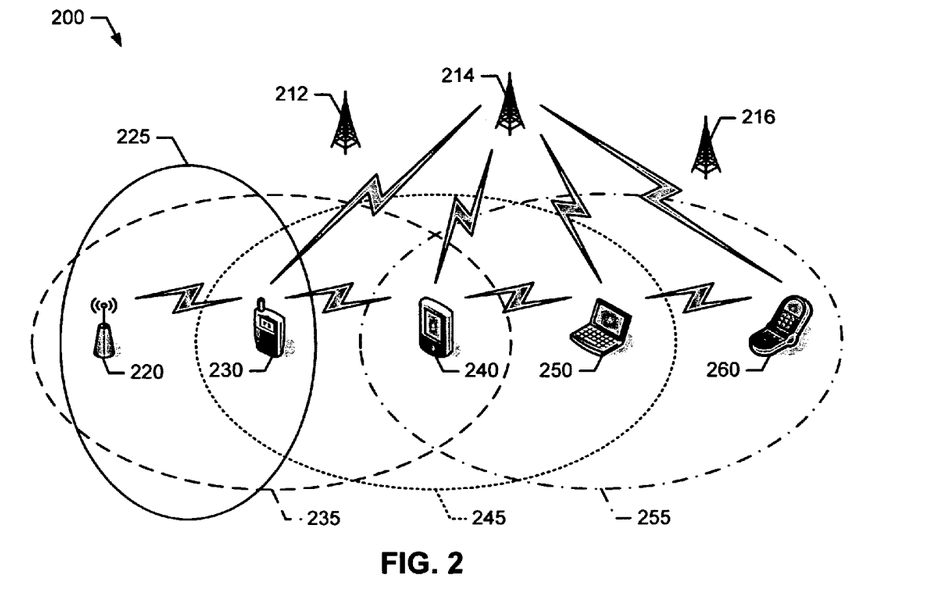
FIG. 2 is a schematic diagram representation of an example extended-local area system based on short messaging service.

Referring to FIG. 2, for example, an extended-local area system 200 based on short messaging service (SMS) may include one or more base stations, generally shown as 212, 214, and 216. Each of the base stations 212, 214, and 216 may provide wireless communication services within a coverage area associated with a WMAN and/or WWAN. For example, the base stations 212, 214, and 216 may operate based on WiMAX technology (e.g., in accordance with the IEEE 802.16 family of standards) and/or cellular radio technology.

The extended-local area system 200 may also include one or more access points, generally shown as 220. In one example, the access point 220 may provide wireless communication services within a coverage area 225 associated with a WLAN. For example, the access point 220 may operate based on Wi-Fi technology (e.g., in accordance with the IEEE 802.11 family of standards). Accordingly, the coverage area 225 may be smaller than any one of the coverage areas of the base stations 212, 214, and 216 (e.g., the coverage of the base station 214 is greater than the coverage area 225).

Further, the extended-local area system 200 may include one or more subscriber stations, generally shown as 230, 240, 250, and 260. As described in detail below, each of the subscriber stations 230, 240, 250, and 260 may include a wireless communication platform having two or more wireless communication devices (e.g., the wireless communication platform 300 of FIG. 3). In one example, each of the subscriber stations 230, 240, 250, and 260 may communicate with the base stations 212, 214, and/or 216 based on WiMAX technology and/or cellular radio technology. Each of the subscriber stations 230, 240, 250, and 260 may also communicate with an access point based on Wi-Fi technology. For example, the subscriber station 230 may communicate with the access point 220 because the subscriber station 230 is within the coverage area 225. In a similar manner, each of the subscriber stations 230, 240, 250, and 260 may communicate with other subscriber stations within a corresponding communication area via SMS messages. In one example, the subscriber station 230 may communicate with subscriber stations within the communication area 235 (e.g., the subscriber station 240). The subscriber station 240 may communicate with subscriber stations within the communication area 245 (e.g., the subscriber stations 230 and 250). The subscriber station 250 may communicate with subscriber stations within the communication area 255 (e.g., the subscriber stations 240 and 260). As a result, the extended-local area system 200 may extend the coverage area 225 by forwarding location-specific information to one or more of the communication areas 235, 245, and/or 255 via SMS message(s). By operating in a mesh network-like manner, the subscriber stations 230, 240, 250, and/or 260 may distribute location-specific information via SMS messages within the extended-local area system 200.

Each SMS message may include message identification information, source identification information, time stamp information, counter information, and/or other suitable information. In particular, the message identification information may be used to identify an SMS message. In one example, a management entity may provide a cyclic SMS identifier. The source identification information may indicate the source that issued the SMS message. The message identification information and/or the source identification information may be used to determine whether the SMS message was previously received and stored at a particular subscriber station. The time stamp information may indicate when a source (e.g., the access point 220) issued the SMS message. In particular, the time stamp information may be used to determine whether to continue with retransmitting the SMS message. For example, the subscriber station 260 may not transmit the SMS message if the difference between the current time and the time stamp exceeds a threshold period for retransmission. The counter information may indicate a number of times that the SMS message has been forwarded or relayed from one subscriber station to another. Similar to the time stamp information, counter information may be used to determine whether to continue with retransmitting the SMS message. For example, the subscriber station 260 may not transmit the SMS message if the counter information exceeds a threshold number of retransmission.

Although FIG. 2 depicts unicast transmissions from the access point 220 or the subscriber stations 230, 240, 250, and 260, the methods and apparatus described herein are readily applicable to communicate SMS messages via broadcast or multicast transmissions. While the examples herein describe an extend-local area system based on SMS, the methods and apparatus described herein are readily applicable to other suitable messaging services such as enhanced messaging services (EMS), multimedia messaging services (MMS), etc. The methods and apparatus described herein are not limited in this regard.

Figure 3:
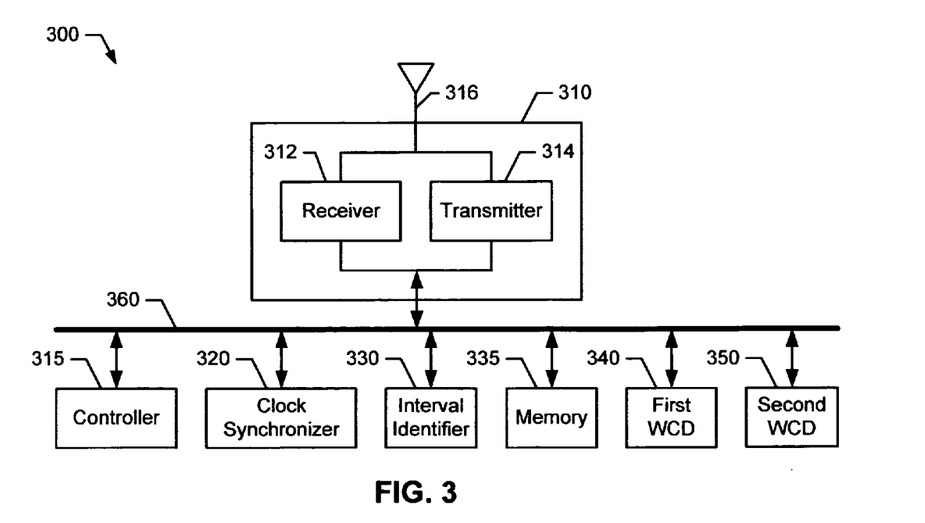
FIG. 3 is a block diagram representation of an example wireless communication platform associated with the example extended-local area system of FIG. 2.

Turning to FIG. 3, for example, a wireless communication platform 300 may include a network interface device (NID) 310, a controller 315, a clock synchronizer 320, an interval identifier 330, and a memory 335. The wireless communication platform 300 may also include two or more wireless communication devices (WCDs), generally shown as 340 and 350. The NID 310, the controller 315, the clock synchronizer 320, the interval identifier 330, the memory 335, and/or the WCDs 340 and 350 may be operatively coupled to each other via a bus 360. While FIG. 3 depicts components of the wireless communication platform 300 coupling to each other via the bus 360, these components may be operatively coupled to each other via other suitable direct or indirect connections (e.g., a point-to-point connection or a point-to-multiple point connection). The wireless communication platform 300 may be integrated into a subscriber station (e.g., any of the subscriber stations 230, 240, 250, and/or 260 of FIG. 2).

The NID 310 may include a receiver 312, a transmitter 314, and an antenna 316. The wireless communication platform 300 may receive and/or transmit data via the receiver 212 and the transmitter 314, respectively. The antenna 316 may include one or more directional or omni-directional antennas such as dipole antennas, monopole antennas, patch antennas, loop antennas, microstrip antennas, and/or other types of antennas suitable for transmission of radio frequency (RF) signals. Although FIG. 3 depicts a single antenna, the wireless communication platform 300 may include additional antennas. For example, the wireless communication platform 300 may include a plurality of antennas to implement a multiple-input-multiple-output (MIMO) system.

In general, the controller 315 may enable or disable the wireless communication platform 300 to operate as part of the extended-local area system 200. In one example, the controller 315 may enable or disable the wireless communication platform 300 to operate as part of the extended-local area system 200 in response to a user input. To conserve power, the wireless communication platform 300 may be disabled from operating as part of the extended-local area system 200.

As described in detail below, the clock synchronizer 320 may synchronize the wireless communication platform 300 with a network clock associated with a base station (e.g., the base station 214 of FIG. 2). The interval identifier 330 may identify an interval to communicate location-specific information based on the network clock. For example, the interval may be an idle interval associated with the base station (e.g., the interval 430 of FIG. 4) and/or an interval designated by the wireless communication network of the base station (e.g., the interval 460 of FIG. 4). During the identified interval, the wireless communication platform 300 may communicate location-specific information via one or more wireless SMS messages. Based on the message identification information and/or the source identification information of an SMS message, the controller 315 may determine whether the SMS message was previously received and/or stored. Further, the controller 315 may determine whether to forward or relay the SMS message to other subscriber stations based on the time stamp information and/or the counter information. The memory 335 may store the SMS message. In one example, the memory 335 may include a buffer to store one or more SMS messages for the wireless communication platform 300 to forward or relay to other subscriber stations.

The first WCD 340 may provide communication services associated with a first wireless communication network (e.g., the WMAN 130 of FIG. 1) and the second WCD 350 may provide communication services associated with a second wireless communication network (e.g., the WLAN 120 of FIG. 1). In one example, the first wireless communication network may operate based on WiMAX technology, and the second wireless communication network may operate based on Wi-Fi technology. Accordingly, following the above example, the first WCD 340 may communicate based on WiMAX technology whereas the second WCD 350 may communicate based on Wi-Fi technology.

Briefly, WiMAX technology provides last-mile broadband connectivity in a larger geographical area than other wireless technology such as Wi-Fi technology. In particular, WiMAX technology may provide broadband or high-speed data connection to various geographical locations where wired transmission may be too costly, inconvenient, and/or unavailable. In one example, WiMAX technology may offer greater range and bandwidth to enable TI-type service to businesses and/or cable/digital subscriber line (DSL)-equivalent access to homes. WiMAX technology may operate in a frequency band ranging from 2 to 11 GHz (e.g., 2.3 to 2.4 GHz, 2.5 to 2.7 GHz, 3.3 to 3.8 GHz, or 4.9 to 5.8 GHz). The 802.16 family of standards were developed by IEEE to provide for fixed, portable, and/or mobile broadband wireless access networks. The WiMAX Forum facilitates the deployment of broadband wireless access networks based on the IEEE 802.16 standards. In particular, the WiMAX Forum ensures the compatibility and inter-operability of broadband wireless equipment. For convenience, the terms "802.16" and "WiMAX" may be used interchangeably throughout this disclosure to refer to the IEEE 802.16 suite of air interface standards.

Wi-Fi technology provides high-speed wireless connectivity within a range of a wireless access point (e.g., a hotspot) in different locations including homes, offices, cafes, hotels, airports, etc. In particular, Wi-Fi technology may allow a wireless device to connect to a local area network without physically plugging the wireless device into the network when the wireless device is within a range of wireless access point (e.g., within 150 feet indoor or 300 feet outdoors). In one example, Wi-Fi technology may offer high-speed Internet access and/or Voice over Internet Protocol (VoIP) service connection to wireless devices. Wi-Fi technology may operate in a frequency range starting at 2.4 gigahertz (GHz) and ending at 2.4835 GHz. The 802.11 family of standards were developed by IEEE to provide for WLANs (e.g., the IEEE std. 802.11a, published 1999; the IEEE std. 802.11b, published 1999; the IEEE std. 802.11 g, published 2003). The Wi-Fi Alliance facilitates the deployment of WLANs based on the 802.11 standards. In particular, the Wi-Fi Alliance ensures the compatibility and inter-operability of WLAN equipment. For convenience, the terms "802.11" and "Wi-Fi" may be used interchangeably throughout this disclosure to refer to the IEEE 802.11 suite of air interface standards.

While the above examples describe a wireless communication devices that operate based on WiMAX technology and Wi-Fi technology, the methods and apparatus are readily applicable to other suitable wireless communication technologies (e.g., cellular radio technology, Bluetooth® technology, etc.). Further, although the components shown in FIG. 3 are depicted as separate blocks within the wireless communication platform 300, the functions performed by some of these blocks may be integrated within a single semiconductor circuit or may be implemented using two or more separate integrated circuits. For example, although the receiver 312 and the transmitter 314 are depicted as separate blocks within the NID 310, the receiver 312 may be integrated into the transmitter 314 (e.g., a transceiver). In another example, the controller 315, the clock synchronizer 320 and the interval identifier 330 are depicted as separate blocks, the controller 315, the clock synchronizer 320 and the interval identifier 330 may be integrated into a single component to perform respective functions (e.g., a processor). In addition, while FIG. 3 depicts two WCDs, the wireless communication platform 300 may include additional WCDs. The methods and apparatus described herein are not limited in this regard.

As wireless communication becomes more and more popular, subscribers may receive information in various locations. Referring back to FIG. 2, for example, the access point 220 may distribute location-specific information. In one example, the access point 220 may transmit location-specific information such as advertisements and/or events in shopping centers, grocery stores, conferences, exhibitions, trade shows, streets, etc. In another example, location-specific information may include information associated with buildings, neighborhoods, local traffic, local weather, etc. However, the range of the access point 220 to transmit location-specific information may not extend beyond the coverage area 225.

As noted above, the base station 214 may provide wireless communication services to a coverage area greater than the coverage area 225 but the base station 214 may not support distributing location-specific information without using a global positioning system (GPS) and/or collaborating with other base stations such as the base stations 212 and/or 216. Accordingly, the extended-local area system 200 may distribute location-specific information beyond the coverage area 225. The methods and apparatus described herein are not limited in this regard.

Figure 4:
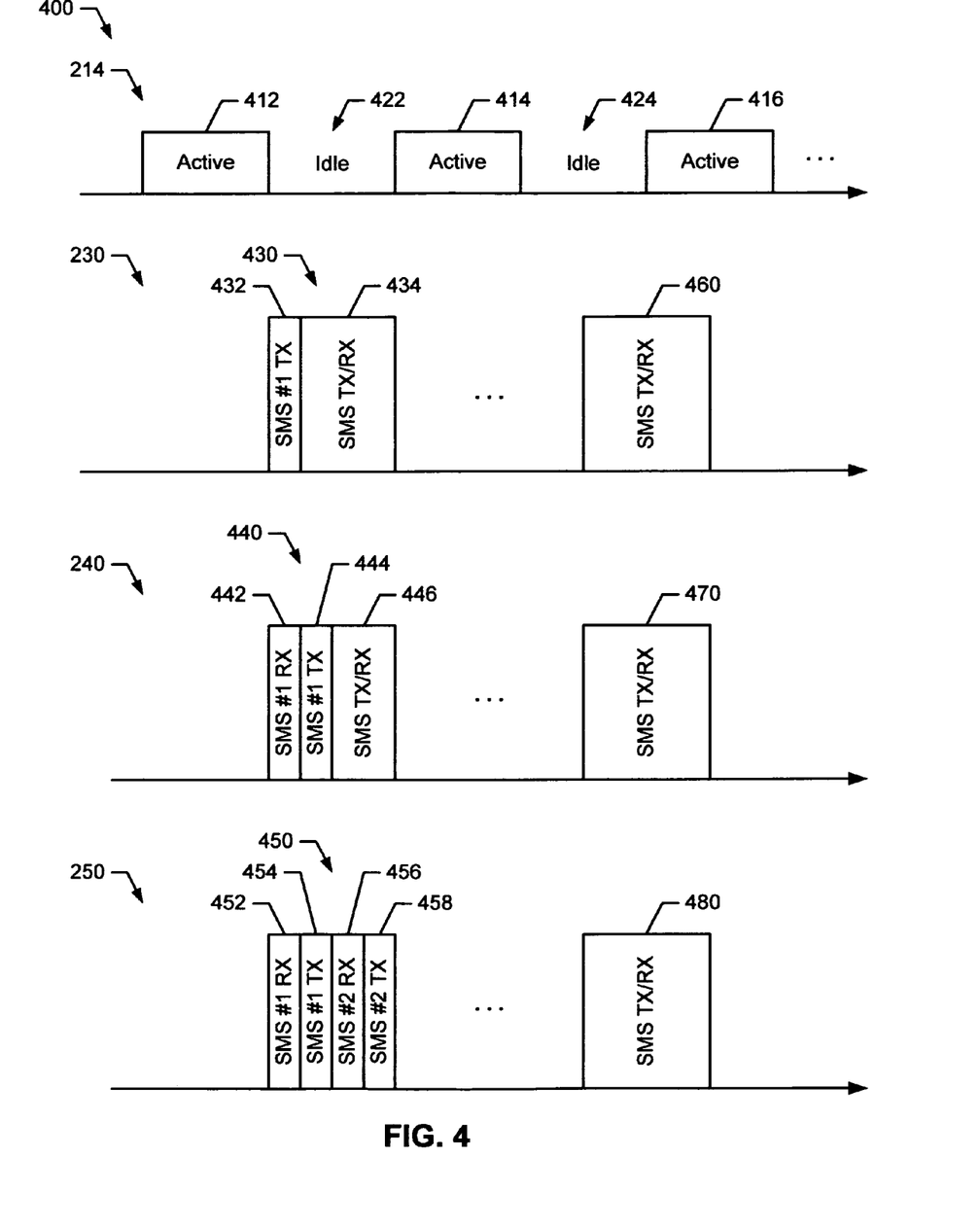
FIG. 4 depicts an example timing sequence of the example extended-local area system of FIG. 2.

As noted above, the base station 214 may be associated with a WMAN. The base station 214 may operate in an active mode or an idle mode. In the example of FIG. 4, the base station 214 (FIG. 2) may be active for one or more active intervals, generally shown as 410, 412, and 414. In one example, the base station 214 may communicate with one or more subscriber stations within a coverage area of the base station 214 (e.g., the subscriber stations 230, 240, 250, and/or 260 of FIG. 2) during one or more of the active intervals 410, 412, and 414.

The subscriber stations 230, 240, and 250 may identify an interval to communication location-specific information. In one example, the base station 214 may be idle for one or more idle intervals, generally shown as 422 and 424. Accordingly, the subscriber stations may identify intervals corresponding to the idle intervals associated with base station 214, generally shown as 430, 440, and 450. During the interval 430, for example, the subscriber station 230 may turn to a channel to communicate with the access point 220 and/or other subscriber station(s) (e.g., the subscriber stations 240, 250 and/or 260 of FIG. 2). In particular, the subscriber station 230 (FIG. 2) may receive location-based information from the access point 220 (FIG. 2) via an SMS message. As noted above, the access point 220 may transmit location-based information to one or more subscriber stations within a coverage area of the access point 220 (e.g., the coverage area 225 of FIG. 2). The subscriber station 230 may also relay the location-based information to other subscriber stations, which may be outside the coverage area 225 but within the communication area 235 of the subscriber station 230. In one example, the subscriber station 230 may transmit the location-based information to the subscriber station 240 via an SMS message during the SMS #1 transmission (TX) interval 432. For example, the interval 430 may be 100 milliseconds (ms) and the SMS #1 TX interval 432 may be 100 microseconds (µs). Accordingly, the subscriber station 230 may receive and/or transmit other SMS messages during the remaining period 434 (SMS TX/RX) of the interval 430.

The subscriber station 240 may receive the SMS message from the subscriber station 230 during the SMS #1 RX interval 442. In turn, the subscriber station 240 may relay the location-based information to other subscriber stations, which may be outside the coverage area 225 and the communication area 235 but within the communication area 245 of the subscriber station 240 (e.g., the subscriber station 250 of FIG. 2). Accordingly, the subscriber station 240 may transmit the location-based information via an SMS message during the SMS #1 TX interval 444. The subscriber station 240 may receive and/or transmit other SMS messages during the remaining period 446 (SMS TX/RX) of the interval 440.

The subscriber station 250 may receive the SMS message from the subscriber station 240 during the SMS #1 RX interval 452. In turn, the subscriber station 250 may relay the location-based information to other subscriber stations, which may be outside the coverage area 225 and the communication areas 235 and 245 but within the communication area 255 of the subscriber station 250 (e.g., the subscriber station 260 of FIG. 2). Accordingly, the subscriber station 240 may transmit the location-based information via an SMS message during the SMS #1 TX interval 454. As a result, the extended-local area system 200 may extend the distribution of the SMS message from the coverage 225 to the communication areas 235, 245, and 255.

Further, the subscriber station 250 may receive and/or transmit other SMS messages during the remaining period of the interval 450. For example, the subscriber station 250 may receive a second SMS message during the SMS #2 RX interval 456 from another access point (not shown) or subscriber station (e.g., the subscriber station 260). Accordingly, the subscriber station 250 may transmit the second SMS message during the SMS #2 TX interval 458.

In addition or alternatively, the subscriber stations 230, 240, and 250 may identify other suitable intervals to communicate location-specific information. In one example, the wireless communication network of the base station 214 may designate an interval for the subscriber stations 230, 240, and 250 to communicate location-specific information, generally shown as 460, 470, and 480. The intervals 460, 470, and 480 may overlap the active interval 416 and the idle interval 424 associated with the base station 214.

Although FIG. 4 depicts particular examples of communicating SMS messages, the methods and apparatus described herein are readily applicable to receive and/or transmit other suitable number of SMS messages. In one example, the subscriber station 260 may not retransmit the SMS message originally from the access point 220 to other subscriber stations if the counter of the SMS message exceeds a threshold number of retransmissions. The methods and apparatus described herein are not limited in this regard.

Figure 5:
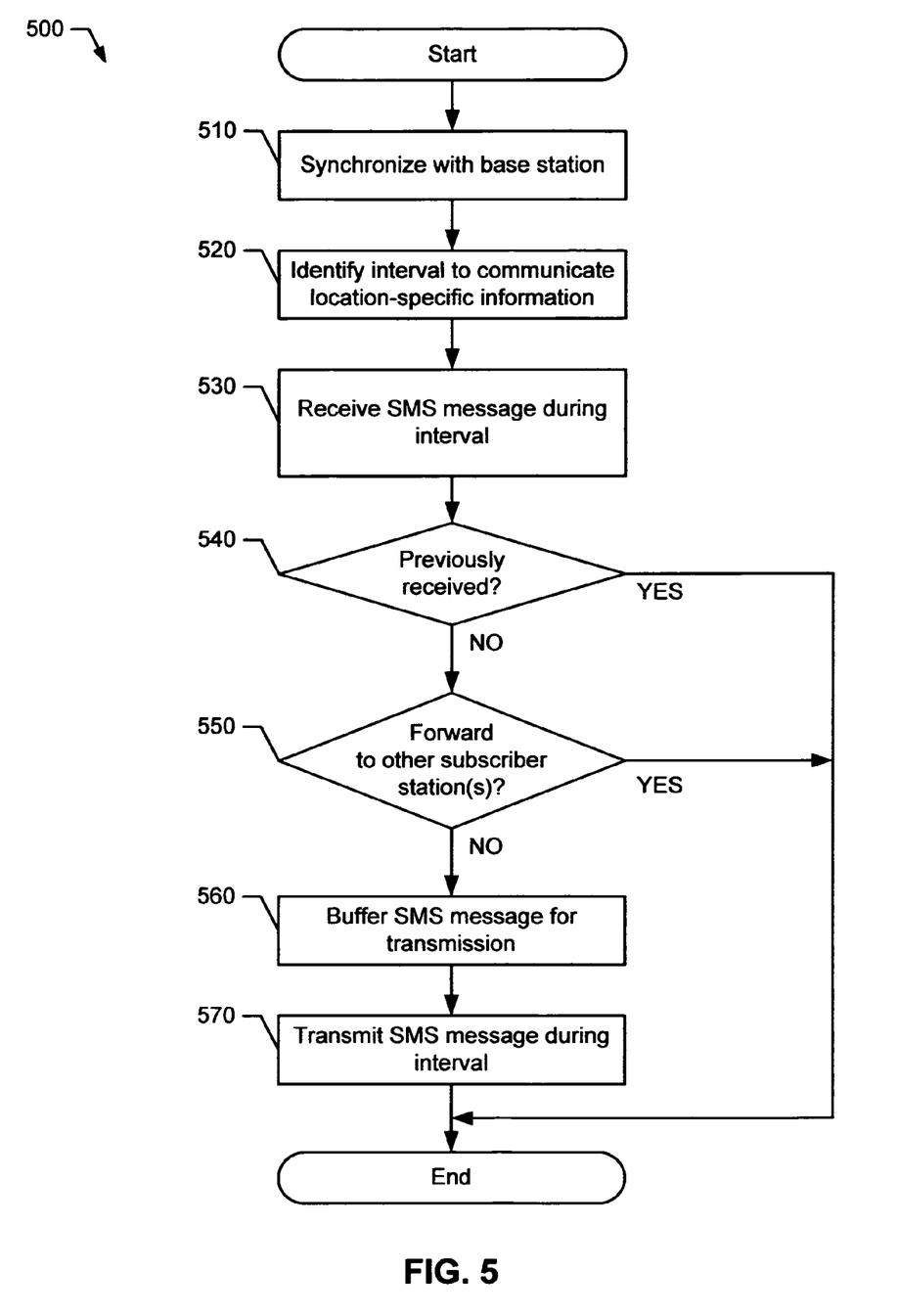
FIG. 5 is a flow diagram representation of one manner in which the example wireless communication platform of FIG. 3 may be configured.

FIG. 5 depicts one manner in which the wireless communication platform 300 of FIG. 3 may be configured to provide the example extended-local area system 200 of FIG. 2. The example process 500 of FIG. 5 may be implemented as machine-accessible instructions utilizing any of many different programming codes stored on any combination of machine-accessible media such as a volatile or non-volatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIG. 5, these actions may be performed in other temporal sequences. Again, the example process 500 is merely provided and described in conjunction with the system and apparatus of FIGS. 2 and 3, respectively, as an example of one way to provide an extended-local area system.

In the example of FIG. 5, the process 500 may begin with the wireless communication platform 300 (e.g., via the clock synchronizer 320) synchronizing with a network clock associated with a base station of a first wireless communication network (block 510). With reference to FIG. 2, for example, the subscriber station 230 may synchronize with a network clock the base station 214 of a cellular radio network. In particular, the subscriber station 230 may receive clock information from the base station 214. Accordingly, the subscriber station 230 may determine when the base station 214 is idle.

Based on the clock information, the wireless communication platform 300 (e.g., via the interval identifier 330) may identify an interval to communicate location-specific information (block 520). Turning back to FIG. 2, the wireless communication network associated with the base station 214 may designate an interval for the wireless communication platform 300 to communicate location-specific information (e.g., every minute on each hour). To avoid interference between the WCDs 340 and 350 and/or reduce power consumption by the wireless communication platform 300, the subscriber station 230 may identify an interval (e.g., the interval 430 of FIG. 4) corresponding to an idle interval associated with the base station 214 (e.g., the idle interval 422 of FIG. 4). In addition or alternatively, the subscriber station 230 may identify other suitable intervals to communicate location-specific information. For example, the subscriber station 230 may communicate location-specific information during an interval (e.g., the interval 460 of FIG. 4) that overlaps an active interval and an idle interval associated with the base station 214 (e.g., the active interval 416 and the idle interval 424 of FIG. 4, respectively).

During the interval identified at block 520, the wireless communication platform 300 may communicate location-specific information associated with a second wireless communication network. The wireless communication platform 300 may turn to a channel to receive and/or transmit one or more SMS messages. In particular, the wireless communication platform 300 may receive location-specific information from an access point or another subscriber station via an SMS message (block 530). For example, each SMS message may include location-specific information, message identification information, source identification information, time stamp information, and counter information. Based on the message identification information and/or the source identification information, the wireless communication platform 300 (e.g., via the controller 315) may determine whether the SMS message was previously received (e.g., whether the SMS message is a duplicate) (block 540). If the wireless communication platform 300 previously received the SMS message, the process 500 may terminate.

Otherwise if the wireless communication platform 300 did not previously receive the SMS message at block 540, the wireless communication platform 300 (e.g., via the controller 315) may determine whether to forward or relay the SMS message to other subscriber station(s) (block 550). In particular, the wireless communication platform 300 may determine whether the SMS message exceeded one or more thresholds based on the time stamp information and the counter information of the SMS message. If the SMS message exceeded thresholds associated with the time stamp information and the counter information, the process 500 may terminate. In one example, the wireless communication platform 300 may not store and transmit the SMS message if the difference between the current time and the time stamp exceeds a threshold period for retransmission. In another example, the wireless communication platform 300 may not store and transmit the SMS message if the SMS message has been retransmitted for a number of times that exceeds a threshold number of retransmission.

Otherwise if the SMS message did not exceed the thresholds associated with the time stamp information and the counter information at block 550, the wireless communication platform 300 may store the SMS message in a buffer of the memory 335 for retransmission (block 560). The wireless communication platform 300 may increment the counter information of the SMS message. Accordingly, the wireless communication platform 300 may transmit the SMS message to other subscriber station(s) during the interval identified at block 520 (570). In a mesh network-like manner, the wireless communication platform 300 may transmit the SMS message to the other subscriber station (s) because the other subscriber station(s) may be within the coverage area associated with the first wireless communication network but outside the coverage area associated with the second wireless communication network. In one example, the other subscriber station(s) may be within the coverage area of the base station 214 but outside the coverage area of the access point 220. The methods and apparatus described herein are not limited in this regard.

Although the above examples describe two wireless communication devices, the methods and apparatus described herein may include three or more wireless communication devices. Further, while the above examples describe a WLAN device and a WMAN device within the wireless communication platform 300 of FIG. 3, the methods and apparatus described herein may include other wireless communication devices that may operate in accordance with other suitable types of wireless communication networks and/or include other combinations of wireless communication devices. In one example, the wireless communication platform 300 may include a wireless communication device for a WWAN as an additional wireless communication device or a substitute wireless communication device. In particular, the wireless communication platform 300 may include a wireless communication device associated with a WLAN (e.g., based on Wi-Fi technology) and a wireless communication device associated with a WWAN (e.g., based on cellular radio technology). In another example, the wireless communication platform 300 may include a WPAN device, a WLAN device, and a WMAN device. The methods and apparatus described herein are not limited in this regard.

Figure 6:
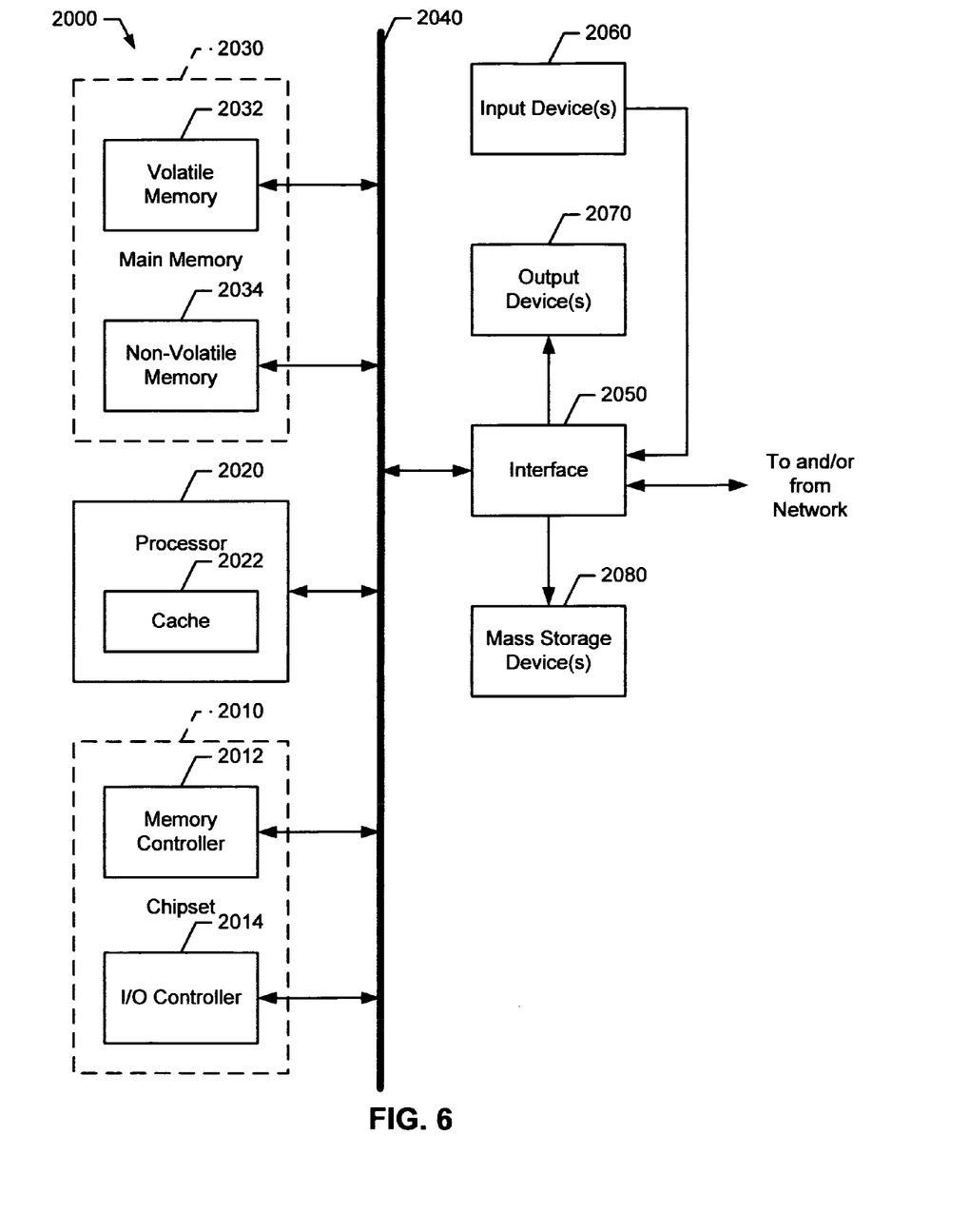
FIG. 6 is a block diagram representation of an example processor system that may be used to implement the example wireless communication platform.

FIG. 6 is a block diagram of an example processor system 2000 adapted to implement the methods and apparatus disclosed herein. The processor system 2000 may be a desktop computer, a laptop computer, a handheld computer, a tablet computer, a personal digital assistant (PDA), a server, an Internet appliance, and/or any other type of computing device.

The processor system 2000 illustrated in FIG. 6 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WPAN components, WLAN components, WMAN components, WWAN components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented by flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   synchronizing, by a subscriber station, with a network clock associated with a base station of a wireless metropolitan area network having a first coverage area;
   receiving, by the subscriber station, a first short messaging service (SMS) message, including time stamp information, counter information, and location-specific information associated with an access point of a wireless local area network having a second coverage area, which is smaller than the first coverage area, wherein the subscriber station is located inside the first coverage area and outside the second coverage area when said receiving of the first SMS message occurs and the first SMS message is a re-broadcasted version of a second SMS message, originated from another subscriber station communicatively coupled with the access point, that includes the location-specific information;
   identifying, by the subscriber station, an interval to communicate the location-specific information based on the network clock;
   determining, by the subscriber station, whether counter information exceeds a threshold; and
   broadcasting, by the subscriber station, a third SMS message, including the location-specific information, during the interval based on the time stamp information and said determining.

2. A method as defined in claim 1, wherein synchronizing with the network clock comprises receiving clock information from a base station of the wireless metropolitan area network, the clock information having information indicative of at least one of an idle interval associated with the base station or an interval designated by the wireless metropolitan area network.

3. A method as defined in claim 1, further comprising receiving the SMS message from at least one of the access point or another subscriber station located within the first and second coverage areas.

4. A method as defined in claim 1, wherein broadcasting the third SMS message based on the time stamp information comprises:
determining whether another threshold, related to the time stamp information, has been exceeded.

5. A method as defined in claim 1 further comprising buffering the location-specific information until said broadcasting of the third SMS message.

6. A method of claim 1, further comprising:
disabling ability of the subscriber station to operate as part of an extended-local area system, while the subscriber station is still enabled to communicate via the wireless metropolitan area network, based on user input.

7. A method of claim 1, wherein said receiving is to occur during another interval and the method further comprises:
configuring a network interface device to receive one or more SMS messages during the another interval based on the network clock.

8. A method of claim 1, wherein the location-specific information is an advertisement and/or event associated with a shopping center, grocery store, conference, exhibition, tradeshow, or street.

9. A method of claim 1, wherein the location-specific information includes information associated with local weather and/or local traffic.

10. A method of claim 1, wherein the first SMS message further includes source identification information identifying the acess point as a source of the location-specific information.

11. A non-transitory machine-accessible medium including instructions, which when executed, causes a subscriber station to:
synchronize with a network clock associated with a base station of a wireless metropolitan area network having a first coverage area;
receive a first short messaging service (SMS) message, including time stamp information, counter information, and location-specific information associated with an access point of a wireless local area network having a second coverage area, which is smaller than the first coverage area, wherein the subscriber station is located inside the first coverage area and outside the second coverage area and the first SMS message is a re-broadcasted version of a second SMS message, originated from another subscriber station communicatively coupled with the access point, that includes the location-specific information;
identify an interval to communicate the location-specific information based on the network clock;
determine whether the counter information exceeds a threshold; and
broadcast a third SMS message, including the location-specific information, during the interval based on the time stamp information and the determination whether the counter information exceeds the threshold.

12. A non-transitory machine-accessible medium as defined in claim 11, wherein the instructions, when executed, causes the subscriber station to synchronize with the network clock by receiving clock information from a base station of the wireless metropolitan area network, and wherein the clock information comprises information indicative of at least one of an idle interval associated with the base station or an interval designated by the wireless metropolitan area network.

13. A non-transitory machine-accessible medium as defined in claim 11, wherein the instructions, when executed, causes the subscriber station to receive the first SMS message from at least one of the access point or another subscriber station located within the first and second coverage areas.

14. A non-transitory machine-accessible medium as defined in claim 11, wherein the instructions, when executed, causes the subscriber station to broadcast the third SMS message based on the time stamp information by causing the subscriber station to
determine whether another threshold, related to the time stamp information, has been exceeded.

15. A non-transitory machine accessible medium as defined in claim 11, wherein the instructions, when executed, causes the subscriber station to buffer the location-specific information in a memory until said broadcasting of the third SMS message.

16. An apparatus comprising:
a clock synchronizer to synchronize with a network clock associated with a base station of a wireless metropolitan area network having a first coverage area;
an interval identifier operatively coupled to the clock synchronizer to identify an interval based on the network clock; and
a network interface device to receive a first short messaging service (SMS) message, including time stamp information, counter information, and location-specific information associated with an access point of a wireless local area network having a second coverage area, which is smaller than the first coverage area, wherein the apparatus is located inside the first coverage area and outside the second coverage area and the first SMS message is a re-broadcasted version of a second SMS message, originated from a subscriber station communicatively coupled with the access point, that includes the location-specific information, the network interface device operatively coupled to the interval identifier to broadcast a third SMS message, including the location-specific information, during the interval based on the time stamp information and a determination of whether the counter information exceeds a threshold.

17. An apparatus as defined in claim 16, wherein the clock synchronizer is configured to receive clock information from a base station of the wireless metropolitan area network, and wherein the clock information comprises information indicative of at least one of an idle interval associated with the base station or an interval designated by the wireless metropolitan area network.

18. An apparatus as defined in claim 16, wherein the network interface device is configured to receive the first SMS message from at least one of the access point or a subscriber station located within the first and second coverage areas.

19. An apparatus as defined in claim 16, wherein the network interface device is configured to broadcast the third SMS message based on a determination of whether the time stamp information exceeds another threshold.

20. An apparatus as defined in claim 16 further comprising a memory to buffer the location-specific information until a broadcast of the third SMS message.

21. A system comprising:
an omni-directional antenna; and
a processor operatively coupled to the antenna to synchronize with a network clock associated with a base station of a wireless metropolitan area network having a first coverage area, to receive a first short messaging service (SMS) message, including time stamp information, counter information, and location-specific information associated with an access point of a wireless local area network having a second coverage area, which is smaller than the first coverage area, wherein the system is located inside the first coverage area and outside the second coverage area and the first SMS message is a re-broadcasted version of a second SMS message, originated from another subscriber station communicatively coupled with the access point, that includes the location-specific information;

to determine whether the counter information exceeds a threshold;

to identify an interval based on the network clock, and to broadcast a third SMS message, including the location-specific information, during the interval based on the time stamp information and the determination of whether the counter information exceeds the threshold.

22. A system as defined in claim 21, wherein the processor is configured to receive clock information from a base station of the wireless metropolitan area network, and wherein the clock information comprises information indicative of at least one of an idle interval associated with the base station or an interval designated by the wireless metropolitan area network.

23. A system as defined in claim 21, wherein the processor is configured to receive the first SMS message from at least one of the access point or a subscriber station located within the first and second coverage areas.

24. A system as defined in claim 21, wherein the processor is configured to buffer the location-specific information in a memory until a broadcast of the third SMS message.

* * * * *